United States Patent
Ueno (10) Patent No.: US 7,415,287 B2
(45) Date of Patent: Aug. 19, 2008

(54) IMAGE APPARATUS

(75) Inventor: Fumihiro Ueno, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 835 days.

(21) Appl. No.: 09/962,881

(22) Filed: Sep. 25, 2001

(65) Prior Publication Data

US 2002/0037747 A1    Mar. 28, 2002

(30) Foreign Application Priority Data

Sep. 25, 2000    (JP) ............... 2000-291162

(51) Int. Cl.
*H04B 1/38*    (2006.01)
*H04N 5/232*    (2006.01)

(52) U.S. Cl. .............. 455/557; 455/556.1; 455/403

(58) Field of Classification Search ............ 455/403, 455/415, 418, 425, 426.1, 556.1, 557, 564, 455/566; 379/93.17, 93.19, 93.23, 204.01, 379/206.01, 354, 355.03, 355.1, 356.01
See application file for complete search history.

(56) References Cited

U.S. PATENT DOCUMENTS

| | | | |
|---|---|---|---|
| 5,414,457 A * | 5/1995 | Kadowaki et al. | 348/14.03 |
| 5,806,005 A | 9/1998 | Hull et al. | |
| 5,843,603 A * | 12/1998 | Ando et al. | 430/30 |
| 5,889,852 A * | 3/1999 | Rosecrans et al. | 379/355.05 |
| 6,167,469 A | 12/2000 | Safai et al. | |
| 6,766,018 B1 * | 7/2004 | Morita | 379/355.09 |
| 6,906,818 B1 * | 6/2005 | Makishima | 358/1.15 |
| 7,027,084 B1 * | 4/2006 | Watanabe | 348/211.2 |
| 7,161,622 B1 * | 1/2007 | Oinoue | 348/211.1 |

FOREIGN PATENT DOCUMENTS

| | | | |
|---|---|---|---|
| EP | 0833494 | | 4/1998 |
| EP | 0 884 781 A2 | | 5/1998 |
| EP | 0 889 635 A2 | | 1/1999 |
| EP | 1 207 680 A2 | | 5/2002 |
| JP | 06-133081 | * | 5/1994 |
| JP | 6-205274 | | 7/1994 |
| JP | 10-023548 | | 1/1998 |
| JP | 10-224591 | | 8/1998 |
| JP | 11032115 A | * | 2/1999 |
| JP | 11-136612 | * | 5/1999 |
| JP | 2000-050223 | * | 2/2000 |
| JP | 2000-244673 | * | 9/2000 |

OTHER PUBLICATIONS

English Abstract for JP-6-205274.
English Abstract for JP 10-023548.
Partial English Translation of JP-6-205274.
Partial English Translation of JP 10-023548.
Office Action dated Jun. 10, 2004 from Japanese Patent Office received in counterpart application 2001-281614.
Partial English Translation of Office Action from counterpart Japanese patent Application.

* cited by examiner

*Primary Examiner*—Melur Ramakrishnaiah
(74) *Attorney, Agent, or Firm*—Morgan & Finnegan, LLP (57) ABSTRACT

In an imaging apparatus, call information is added to a picked-up image, and stored in a memory, and then image data and the call information are transmitted to a communication apparatus. The call information is about a preset destination or a destination entered after imaging. Upon having received the image data and the call information, the communication apparatus calls out based on the call information, and transmits the image data after connection is established with the destination.

12 Claims, 11 Drawing Sheets

IMAGE APPARATUS

BACKGROUND OF THE INVENTION

1. Field of the Invention

The present invention relates to an imaging apparatus.

2. Related Background Art

When an image picked up by a digital camera is transmitted to a desired partner, the image picked up by the digital camera is temporarily transferred to a personal computer or the like. Then, the transferred image data is sent to a desired address by the image transmission function of the personal computer.

However, to perform communications in the above manner, it is difficult to execute communications based on the best use of the instantaneity of the digital camera.

SUMMARY OF THE INVENTION

An object of the present invention is to immediately transmit picked-up image data to a desired destination without losing portability.

Another object of the invention is to simplify an operation when image data is transmitted to a designated destination partner.

Yet another object of the invention is to facilitate the transmission of image data to a partner other than a designated partner, and to improve operability.

DESCRIPTION OF THE PREFERRED EMBODIMENTS

Figure 1:
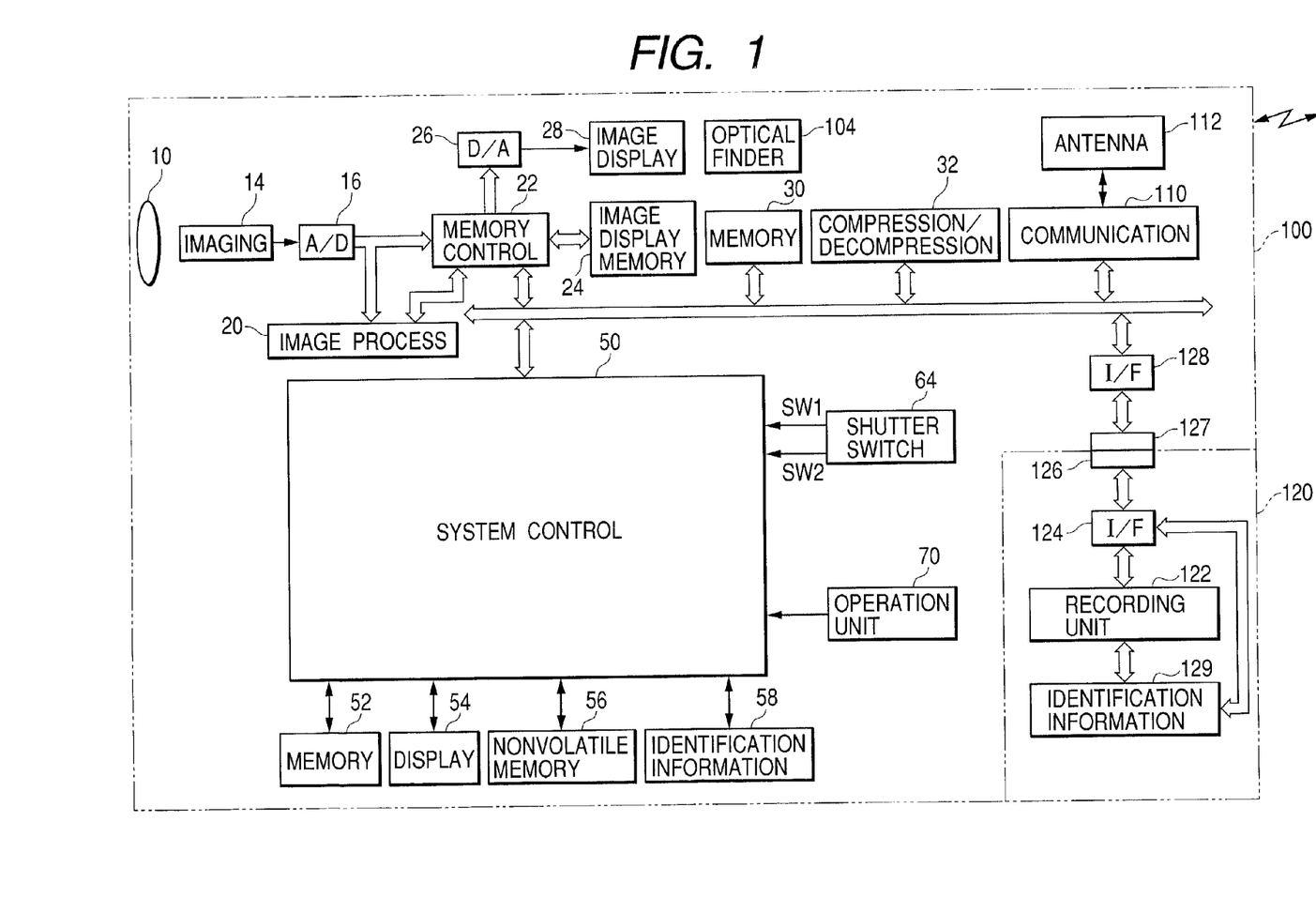
FIG. 1 is a block diagram showing a configuration of an imaging apparatus of an image communication system according to an embodiment of the present invention.
Figure 2:
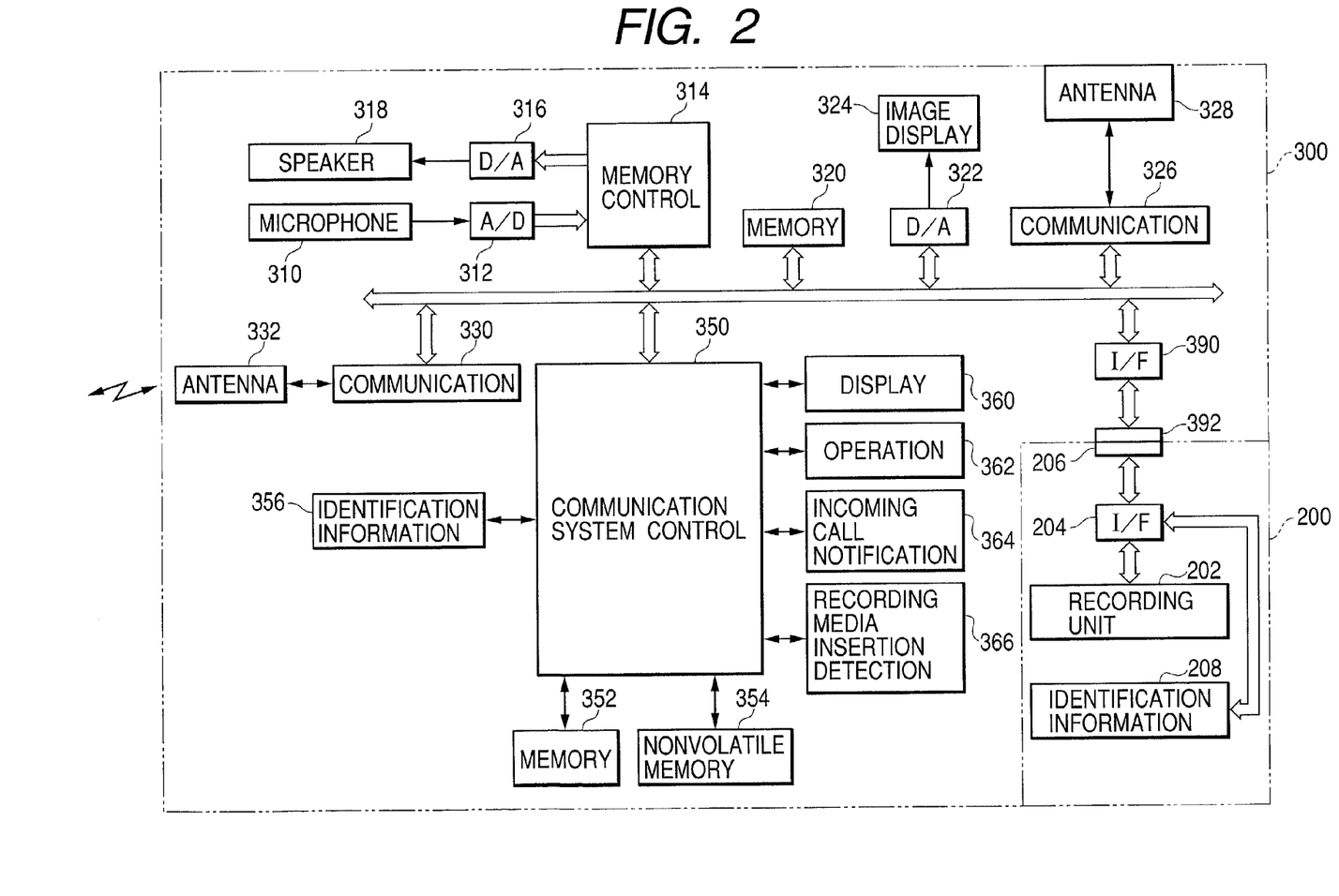
FIG. 2 is a block diagram showing a configuration of a communication apparatus of the image communication system according to the first embodiment of the invention.
Figure 3:
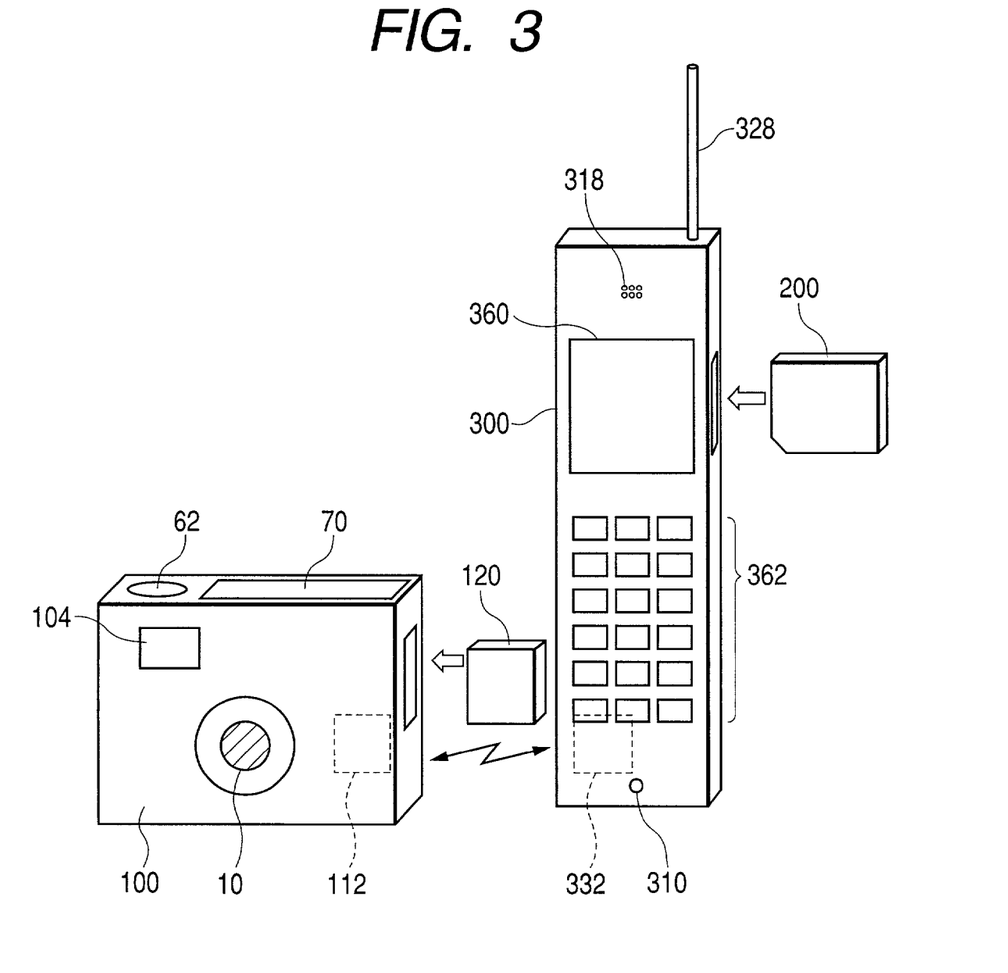
FIG. 3 is a schematic view showing an appearance configuration of the image communication system composed of the imaging apparatus of FIG. 1 and the communication apparatus of FIG. 2.

FIG. 1 is a block diagram showing the configuration of the imaging apparatus of an image communication system according to the first embodiment of the present invention; FIG. 2 a block diagram showing the configuration of the communication apparatus of the image communication system according to the first embodiment of the invention; FIG. 3 a schematic view showing the appearance configuration of the image communication system composed of the imaging apparatus of FIG. 1 and the communication apparatus of FIG. 2; and FIG. 4 a schematic view showing the entire configuration of the image communication system composed of the imaging apparatus of FIG. 1 and the communication apparatus of FIG. 2.

Figure 4:
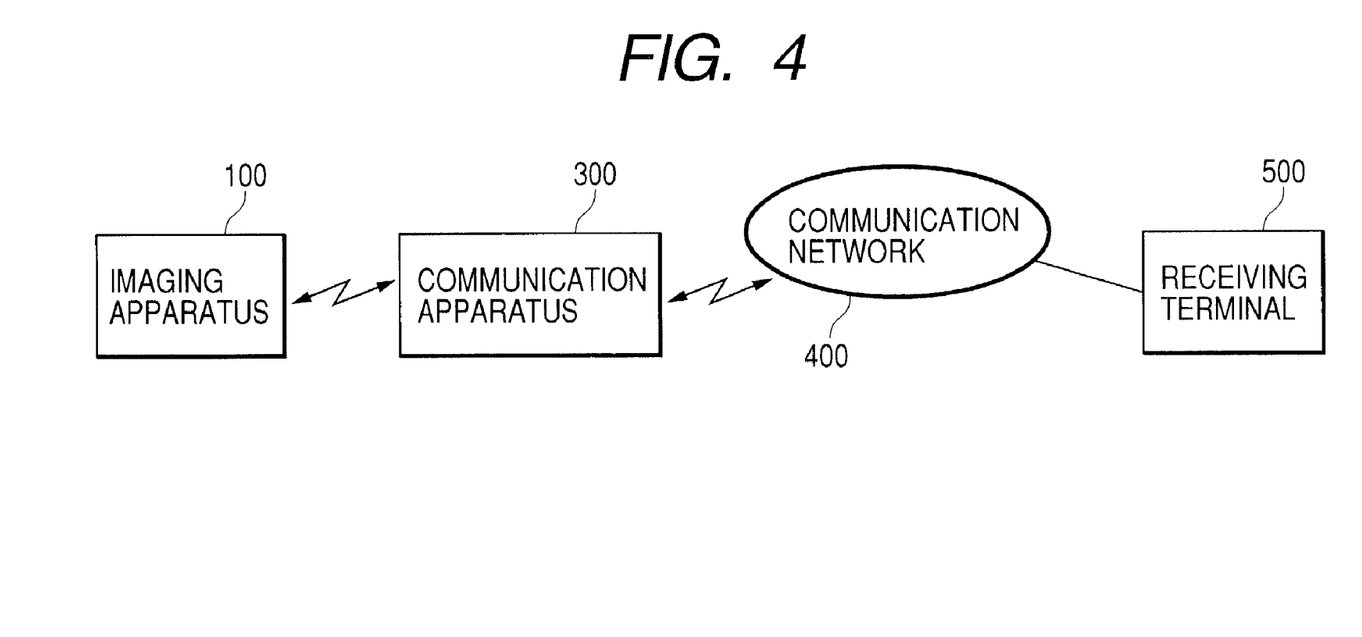
FIG. 4 is a schematic view showing an entire configuration of the image communication system composed of the imaging apparatus of FIG. 1 and the communication apparatus of FIG. 2.

As shown in FIG. 4, the image communication system comprises an imaging apparatus 100 and a communication apparatus 300, which are connected to each other by a radio line. The communication apparatus 300 is connected to a communication network 400, and can transmit an image picked up by the imaging apparatus 100 through the communication network 400 to a receiving terminal 500.

Specifically, as shown in FIG. 3, the imaging apparatus 100 and the communication apparatus 300 transfer commands and data containing imaged images with each other by radio communications respectively through an antenna 112 and an antenna 332. Here, the radio communications between the imaging apparatus 100 and the communication apparatus 300 are carried out by, for example Bluetooth spectrum diffusion method. This Bluetooth method is a radio communication system, which uses a frequency band of 2.4 GHz, and is suitable for short-distance communications by small power. A high-speed transmission rate of 500 Kbps to 1 Mbps can be obtained. Instead of this radio communication system, an infrared ray communication system, e.g., lrDA, can be used.

The imaging apparatus 100 stores the data of an image picked up through a photographic lens 10 in a recording medium 120, and transmits the image data through the antenna 112. The communication apparatus 300 receives the image data through the antenna 332, and transmits the received image data through an antenna 328 to a communication apparatus or a communication base station accommodated in the communication network 400.

Next, the configuration of the imaging apparatus 100 will be described in detail.

The photographic lens 10 includes an optical lens group for capturing the optical image of an object. An imaging device 14 converts the optical image captured through the photographic lens 10 into an electric signal. An A/D converter 16 converts an analog signal outputted from the imaging device 14 into a digital signal, and outputs the digital signal as image data.

An image processing circuit 20 performs predetermined pixel interpolation complement processing and color conversion processing for the image data from the A/D converter 16 or image data from a memory control circuit 22. In addition, in the image processing circuit 20, predetermined operation processing is carried out by using the data of the picked-up image.

The memory control circuit 22 controls the A/D converter 16, the image processing circuit 20, an image display memory 24, a D/A converter 26, a memory 30, and compression/decompression circuit 32. The image data from the A/D converter 16 is written in the image display memory 24 or the memory 30 through the image processing circuit 20 and the memory control circuit 22, alternatively directly through the memory control circuit 22. An image display 28 includes a liquid crystal display panel of a TFT system (TFT LCD), and so on. The display image data written in the image display memory 24 is converted into an analog video signal by the D/A converter 26, and then entered to the image display 28 and displayed. Here, if the data of the picked-up image is subjected to sequential displaying by using the image display 28, an electronic finder function can be realized.

The memory 30 is composed of a volatile memory and/or a nonvolatile memory for storing an imaged static or moving image, and has a storage capacity enough for storing the predetermined number of static images or the moving images of predetermined time. The memory 30 is also used as a work area for a system control circuit 50.

The compression/decompression circuit 32 compress/decompresses the image data by adaptive discrete cosine transform (ADCT) or the like. Specifically, the compression/decompression circuit 32 retrieves an image stored in the memory 30, subjects the image to compression/decompression processing, and then writes the processed data in the memory 30.

The system control circuit 50 controls the entire imaging apparatus 100. A memory 52 stores a constant, a variable, a program, and so on, for operating the system control circuit 50. A display 54 is a liquid crystal display for displaying an operation status or a message by using a character, an image, a voice or the like according to the execution of the program in the system control circuit 50, a speaker or the like. A single or a plurality of such displays are installed in easily viewed positions near the operation unit of the imaging apparatus 100. For example, the display includes in combination an LCD, an LED, a LED, and a pronunciation device, and so on.

A nonvolatile memory 56 enables data to be electrically deleted/recorded, and for example an EEPROM or the like is used. An identification information 58 contains various bits of identification information used to perform authentication before communications carried out with the communication apparatus 300 through the communication circuit 110 and the antenna 112. A shutter switch 64 and an operation part 70 are operation means for entering various operation instructions of the system control circuit 50, each of which includes in combination single or pluralities of switches, touch panels, pointing devices based on sight line detection, voice recognition devices, and so on.

The shutter switch 64 is turned ON after the operation completion of a shutter button 62 shown in FIG. 3, and instructs a series of processing operations to be started: exposure processing for writing a signal retrieved from the imaging device 14 as image data through the A/D converter 16 and the memory control circuit 22 into the memory 30; development processing using operations at the image processing circuit 20 and the memory control circuit 22; and recording processing for retrieving the image data from the memory 30, compressing the image data at the compression/decompression circuit 32, and writing the image data in the recording medium 120.

The operation part 70 is composed of various buttons and touch panels, specifically including a menu button, a setting button, a macro-button, a menu movement+(plus) button, a menu movement−(minus) button, a reproduced image movement+(plus) button, a reproduced image movement−(minus) button, a reproducing switch for setting each function mode, e.g., a reproducing mode, a minus screen reproducing/deleting mode, a PC connecting mode, or the like.

An optical finder 104 enables imaging to be carried out without using the electronic finder function of the image display 28.

The communication circuit 110 includes a short-distance high-speed data communication function based on, for example Bluetooth spectrum diffusion communication system.

An interface 128 is in charge of interfacing with a recording medium 120, e.g., a memory card, a hard disk or the like, and a connector 127 makes connection with the recording medium 120.

In the described embodiment, the numbers of interfaces and connectors for attaching the recording medium are respectively one. However, pluralities of interfaces and connectors for connecting the recording medium may be provided. Interfaces and connectors of different standards may be combined. As an interface and a connector, ones may be used, which are compliant with standards of Personal Computer Memory Card International Association (PCMCIA) card, a compact flash (CF) card, a multimedia card (MMC), and so on. In addition, if the interface 128 and the connector 127 are prepared by using ones compliant with the standards of the PCMIA card, the CF card, and so on, by connecting a LAN card, a modem card, a USB card, Institute of Electrical and Electronic Engineers (IEEE) 1394 card, a P1284 card, a Small Computer System Interface (SCSI) card, and a communication card for PHS or the like, and various other communication cards, it is possible to transfer image data and management information accompanying the image data with another computer or a peripheral equipment such as a printer.

The recording medium 120 includes a recording unit 122 composed of a semiconductor memory, a magnetic disk or the like, an interface 124 with the imaging apparatus 100, a connector 126 for connection with the imaging apparatus 100, and identification information 129.

Next, the detailed configuration of the communication apparatus 300 will be described.

The communication apparatus 300 is a portable telephone set.

A microphone 310 converts a voice into an electric signal, and an A/D converter 312 converts an analog output signal outputted from the microphone 310 into a digital signal, and then outputs this digital signal as voice data. The memory control circuit 314 controls the writing/retrieving of the voice data into/from the memory 320 by the A/D converter 312, and also the entry of the data retrieved from the memory 320 into a D/A converter 316. The D/A converter 316 converts the voice data into an analog signal, and enters the analog signal to a speaker 318. The speaker 318 converts the entered analog signal into a voice signal, and the outputs it.

The memory 320 stores a voice entered from the microphone 310 and/or a static or moving image transmitted from the imaging apparatus 100, and has a storage capacity enough for storing the voice of predetermined time and/or the predetermined number of static images, and the moving image of predetermined time. A D/A converter 322 converts the static or moving image data stored in the memory 320 into an analog signal, and outputs the analog signal as an image signal to an image display 324. The image display 324 displays the image signal from the D/A converter 322.

A communication circuit 326 has a long-distance radio communication function, e.g., Time Division Multiple Access (TDMA), Code Division Multiple Access (CDMA), Wide-band Code Division Multiple Access (WCDMA) or the like, and line-connects the communication apparatus 300 through an antenna 328 to another communication apparatus and/or a communication base station.

A communication circuit 330 has a short-distance high-speed data communication function based on Bluetooth spectrum diffusion communication system, and connects the communication apparatus 300 with another equipment through an antenna 332.

A communication system control circuit 350 controls the entire communication apparatus 300. A memory 352 stores a constant, a variable, a program, and so on, for the operation of the communication system control circuit 350. A nonvolatile memory 354 enables data to be electrically deleted, and for example, an EEPROM may be used.

Identification information 356 contains various bits of identification information used to carry out authentication before communications are performed with the imaging apparatus 100 through the communication circuit 330 and the antenna 332. A display 360 is composed of a liquid crystal display for displaying an operation status or a message by using a character, an image, a voice or the like according to the execution of the program in the communication system control circuit 350, a speaker or the like. A single or a plurality of such displays are installed in easily viewed positions near the operation means of the communication apparatus 300, and each includes in combination, for example LCD, LED, and a pronunciation device, and so on.

An operation unit 362 enters various operation instructions of the communication system control circuit 350, and includes in combination single or pluralities of switches, dials, touch panels, pointing devices based on sight-line detection, voce recognition devices, and so on. The operation unit 362 can perform operations including the turning ON/OFF of power for the communication apparatus 300, the execution of telephone call (off-hook)/stopping (on-hook), the entry of a telephone number, telephone number search, communication mode switching, and so on. Upon the reception of a call from another communication apparatus or a communication base station, an incoming call notification unit 364 notifies the incoming call to the user of the communication apparatus 300 by a sound such as a calling sound, a vocalized sound, and music and/or icon, a image such as a moving image, a static image, and an emitted light and/or vibration, or the like. A recording medium insertion detector 366 detects the loading of a recording medium 200 in a connector 392.

An interface 390 is in charge of interfacing with the recording medium 200, e.g., a memory card, a hard disk, or the like, and the connector 392 makes connection with the recording medium 200.

In the described embodiment, the numbers of interfaces and connectors for attaching the recording medium 200 are respectively one. However, single or pluralities of interfaces and connectors for attaching the recording medium may be provided. In addition, interfaces and connectors of different standards may be used in combination. As an interface and a connector, ones may be used, which are compliant with the standards of Personal Computer Memory Card International Association (PCMCIA) card, a compact flash (CF) card, a multimedia card (MMC), and so on. Further, if the interface 390 and the connector 392 are prepared by using ones compliant with the standards of the PCMIA card, the DF card, and so on, by connecting a LAN card, a modem card, a USB card, Institute Electrical and Electronic Engineering (IEEE) 1394 card, P 1284 card, Small Computer System Interface (SCSI) card, a communication card for PHS, and various other communication cards, it is possible to transfer image data and management information accompanying the image data with another computer or a peripheral equipment such as a printer.

The recording medium 200 includes a recording unit 202 composed of a semiconductor memory, a magnetic disk or the like, an interface 204 with the communication apparatus 300, a connector 206 for making connection with the communication apparatus 300, and identification information 208.

According to the embodiment, to transfer image data to the communication apparatus 300, the imaging apparatus 100 has the function of adding call information to an image data destination partner to the image data, and transferring the image data having the added call information through a radio line to the communication apparatus 300. In addition, the communication apparatus 300 has the function of calling the corresponding destination partner based on the call information added to the image data transferred from the imaging apparatus 100, and transmitting, when connected to the called destination partner, the image data to the destination partner through the communication network 400.

In this case, the imaging apparatus 100 holds destination information indicating a particular destination partner in the nonvolatile memory 56, and retrieves, when the image data is transmitted to the particular destination partner, the particular destination information from the nonvolatile memory 56, converts it into corresponding call information, and then adds this call information to the image data. In addition, when the image data is transmitted to a partner other than the particular destination partner, destination information indicating the partner other than the particular destination partner is entered, the entered destination information is converted into corresponding call information, and then this call information is added to the image data.

Figure 5A:
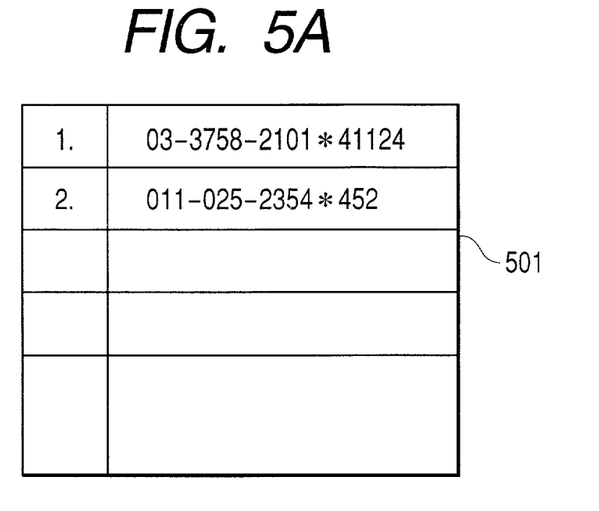
FIGS. 5A and 5B are views, each thereof showing an example of conversion from destination information into call information in the imaging apparatus of FIG. 1.
Figure 5B:
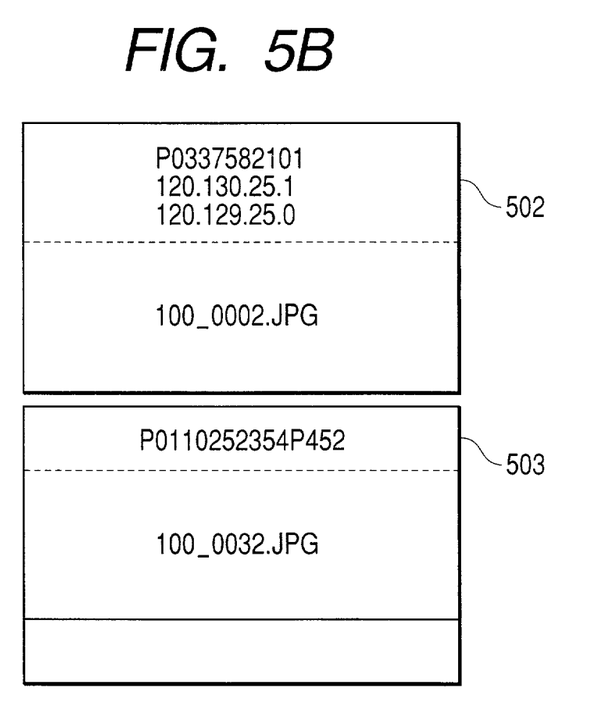

Now, the conversion of such destination information into call information will be described by referring to FIGS. 5A and 5B. Each of FIGS. 5A and 5B shows the example of conversion of destination information into call information in the imaging apparatus of FIG. 1. Here, description will be made by way of example where the particular destination information held in the nonvolatile memory 56 of the imaging apparatus 100 is retrieved, and converted into call information.

In the nonvolatile memory 56, for example as shown in FIG. 5A, there is stored partner's telephone number as particular destination information. Here, to transmit image data to the particular destination partner, particular destination information, e.g., "03-3758-2101_E41124", is retrieved from the nonvolatile memory 56, and this destination information is converted into call information 502 ("P0337582101 120. 130. 25. 1120. 129. 25. O") as shown in FIG. 5B.

Then, this call information is added to image data (100_002. JPG). In addition, when particular destination information, e.g., "011-025-2354_E452", is converted into call information, it is converted into call information 503 ("P0110252354P452") as shown in FIG. 5(*b*). Then, this call information is added to image data (100_0032. JPG).

Moreover, according to the embodiment, there is provided a mode for receiving the image data transferred from the imaging apparatus 100 by the communication apparatus 300, and recording the received image data in the detachable recording medium 200.

Next, an image transmission mode for transmitting image data by adding call information like that described above will be described by referring to FIGS. 6 to 10.

Figure 6:
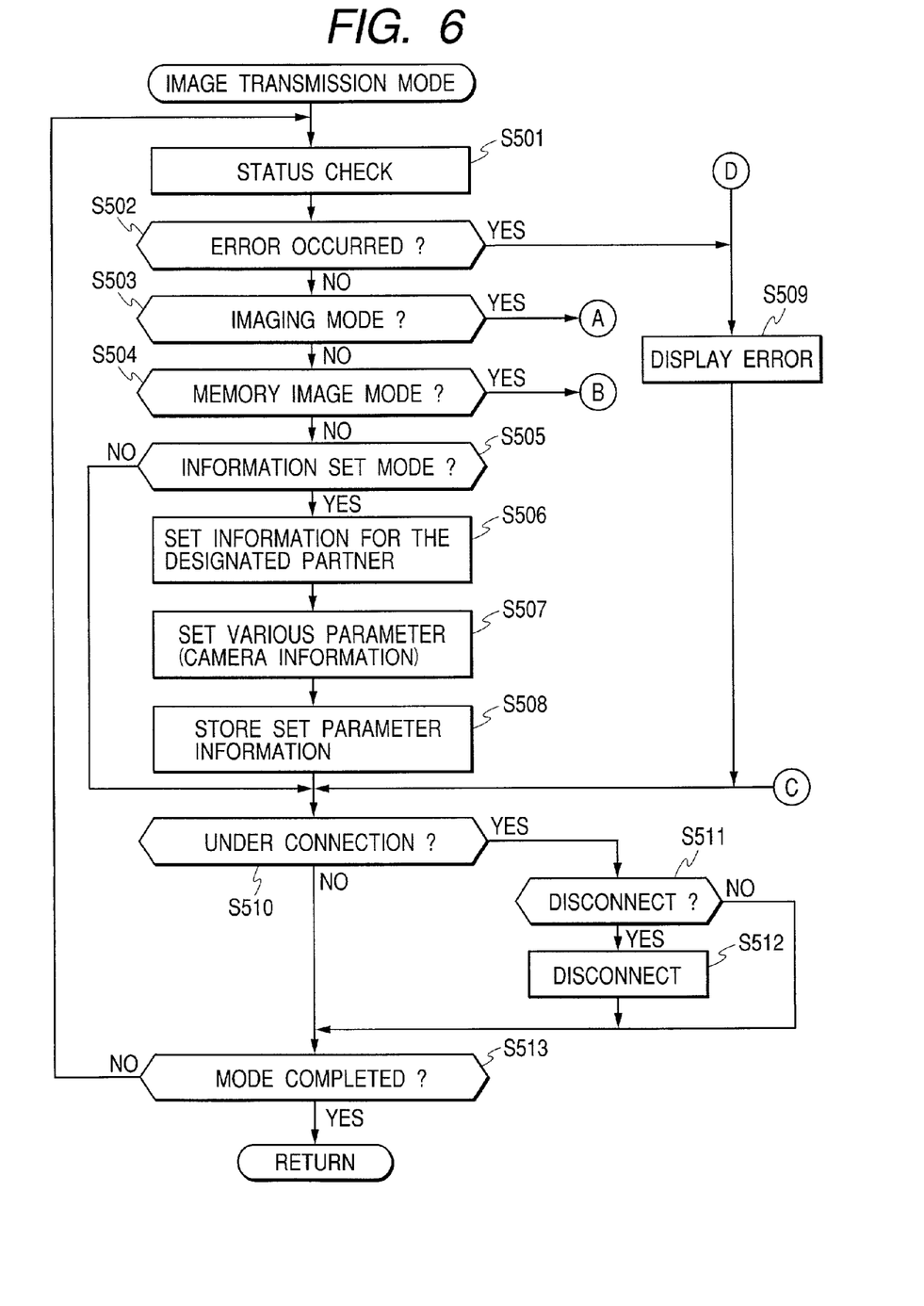
FIG. 6 is a flowchart showing an operation process in the imaging apparatus of FIG. 1.
Figure 7:
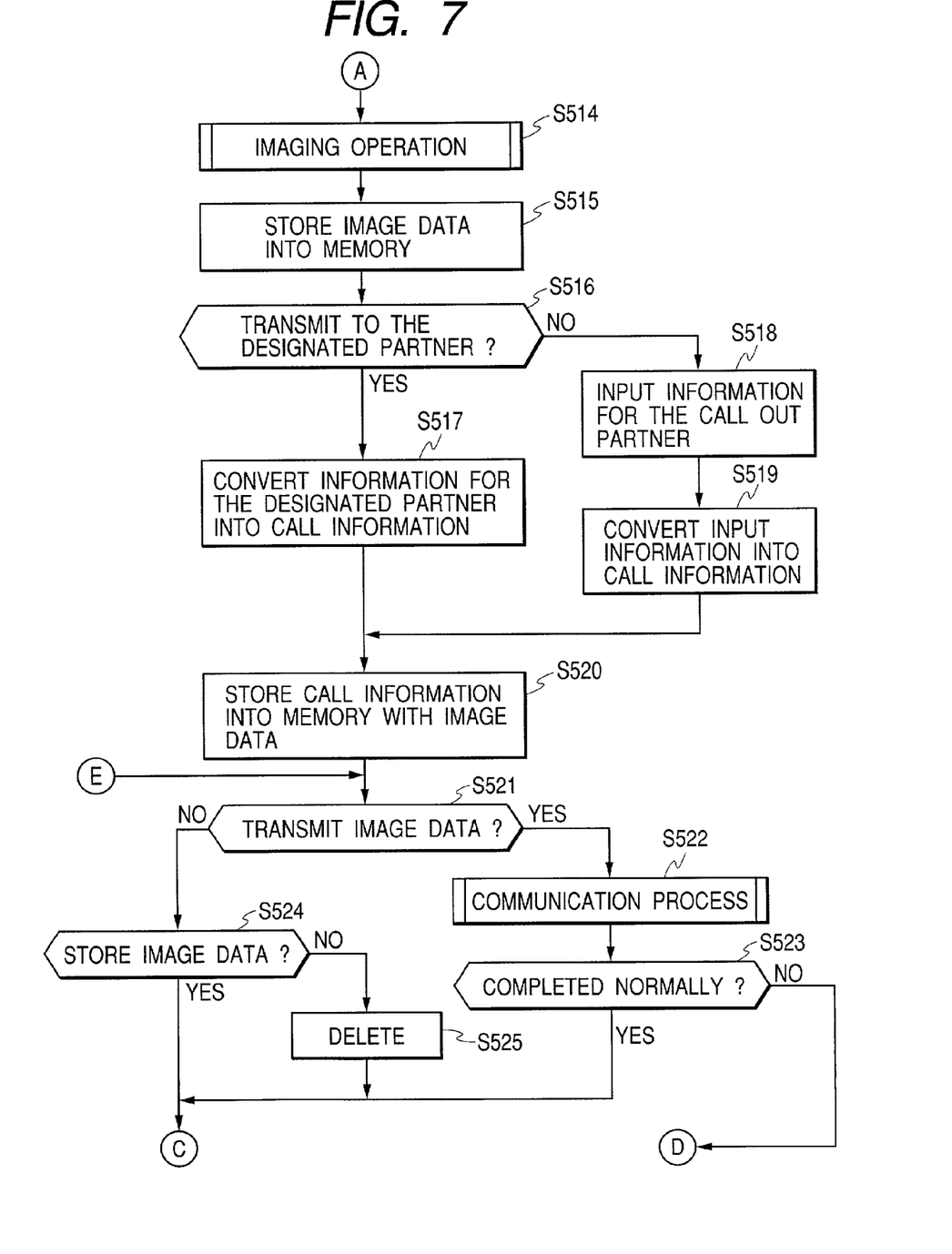
FIG. 7 is a flowchart showing the operation process in the imaging apparatus of FIG. 1.
Figure 8:
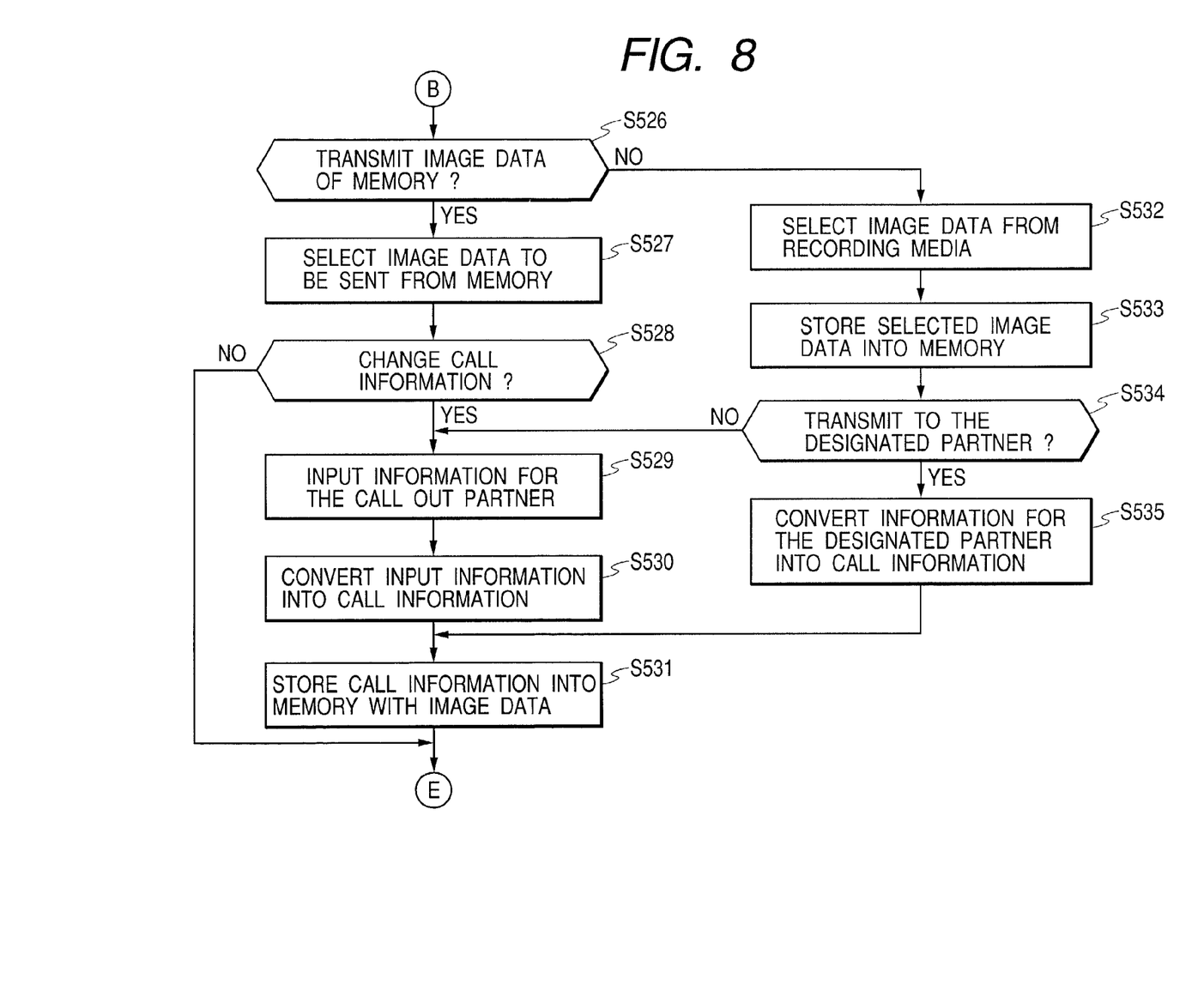
FIG. 8 is a flowchart showing the operation process in the imaging apparatus of FIG. 1.
Figure 9:
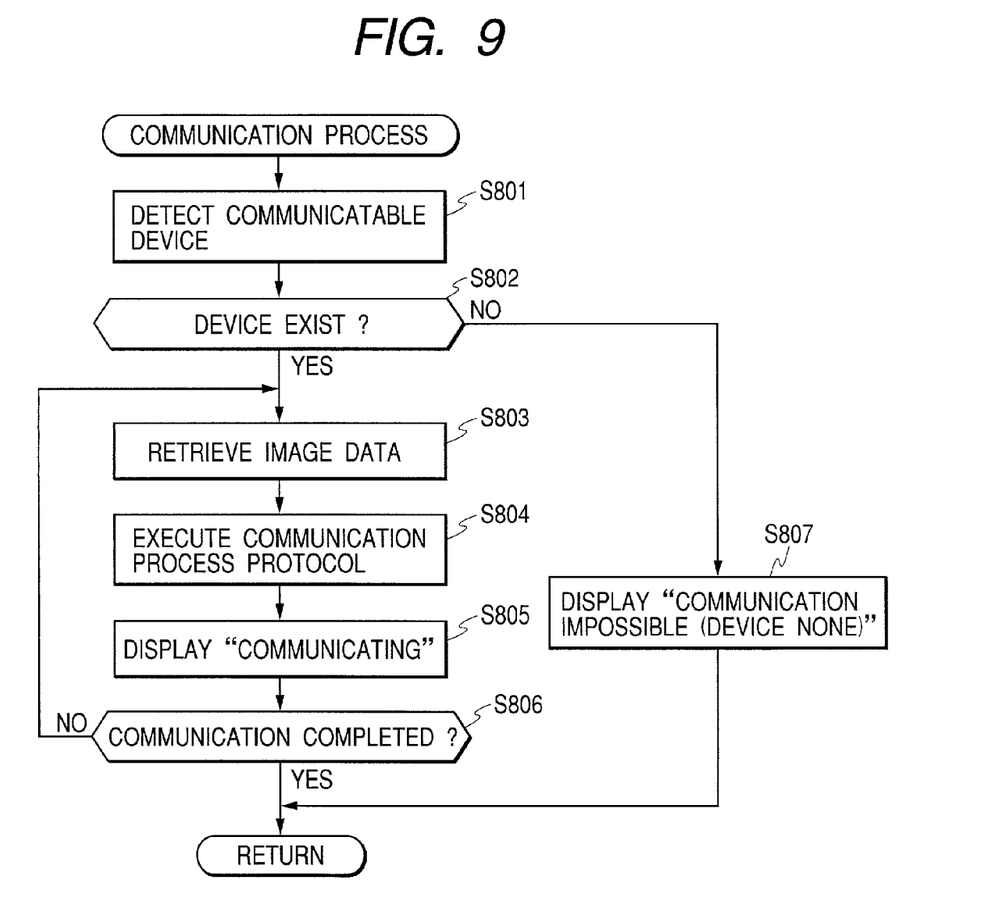
FIG. 9 is a flowchart showing a communication process of step S522 of FIG. 7.

Each of FIGS. 6 to 8 is a flowchart showing an operation process in the imaging apparatus of FIG. 1: FIG. 9 a flowchart showing communication processing of step S522 of FIG. 7; and FIG. 10 a flowchart showing an operation process in the communication apparatus of FIG. 2.

Figure 10:
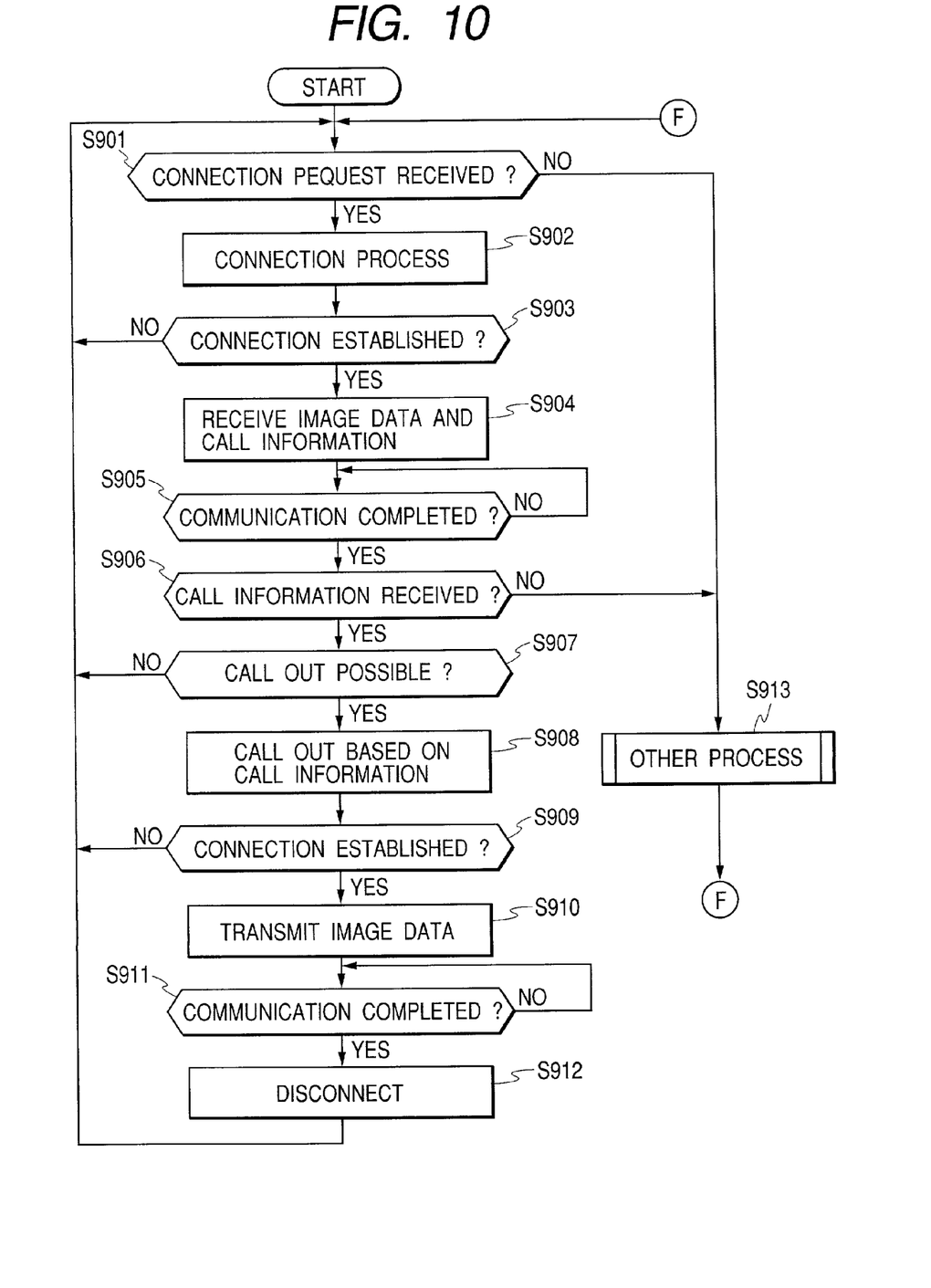
FIG. 10 is a flowchart showing an operation process in the communication apparatus of FIG. 2.

Here, the processes shown in FIGS. 6 to 9 are carried out in accordance with the control of the system control circuit 50; and the process shown in FIG. 10 in accordance with the communication system control circuit 350. FIGS. 6 to 9 show parts of programs stored in the memory 52; and FIG. 10 a part of programs stored in the memory 352.

The system control circuit 50 is a computer designed to execute the processes shown in FIGS. 6 to 9, and the memory 52 is a storage medium for storing a program to be read by the system control circuit 50. In addition, in the arrangement where the program is stored in the recording medium 120, and the system control circuit 50 retrieves the program from the recording medium 120 through the interface 128 and the connector 127, the recording medium 120 is equivalent to the storage medium, from which the system control circuit 50 can retrieve the program. The program may be fed from an external unit to the system control circuit 50 through the communication circuit 110.

The communication system control circuit 350 is a computer designed to execute the process shown in FIG. 10, and the memory 352 is a storage medium for storing a program to be retrieved by the communication system control circuit 350. In addition, in the arrangement where the program is stored in the recording medium 200, and the communication system control circuit 350 retrieves the program from the recording medium 200 through the interface 390 and the connector 392, the recording medium 200 is equivalent to the storage medium, from which the communication system control circuit 350 can retrieve the program. The program may be fed from the external unit to the communication system control circuit 350 through the communication circuits 326 and 330.

Next, description will be made of an operation performed by the imaging apparatus 100 under the control of the system control circuit 50.

To execute the image transmission mode for transmitting the image data by adding call information, as shown in FIG. 6, in the imaging apparatus 100, first, the status of each block is checked in step S501. Then, in step S502, determination is made as to the occurrence of an error based on the result of the status checking. If there is an error, the process proceeds to step S509, where the content of the error is displayed. Then, the process proceeds to step S510.

In step S510, determination is made as to radio connection with the communication apparatus 300. If the radio connection with the communication apparatus 300 is determined, the process proceeds to step S511, where determination is made as to the execution of disconnection with the communication apparatus 300. If the disconnection is executed, the process proceeds to step S512, where a disconnection command is transmitted from the communication circuit 110 to the communication apparatus 300, and the radio connection with the communication apparatus 30 is cut off. Then, the process proceeds to step S513. On the other hand, if the disconnection is not executed, the process proceeds to step S513 skipping step S512. The cutting-off of the disconnection is selected by the user with the operation unit 70.

In step S513, determination is made as to the completion of the image transmission mode. If not completed, the process returns to step S501. If completed, it is the end of the entire process. The end of the image transmission mode is selected by the user with the operation unit 70.

On the other hand, if it is determined in step S510 that the status is not under the radio connection with the communication apparatus 300, then the process proceeds to step S513.

If no errors are determined in step S502, the process proceeds to step S503, where determination is made as to whether a mode is an imaging mode or not. On the imaging mode, an image is picked up, and then image data obtained by this imaging is immediately transmitted. If the mode is not an imaging mode, the process proceeds to step S504, where determination is made as to whether the mode is a memory image mode or not. On the memory image mode, the image data stored in the memory 30 or the recording medium 120 is transmitted. If the mode is not a memory image mode, then the process proceeds to step S505, where determination is made as to whether the mode is an information set mode or not. The selection of such a mode is made by the user with the operation unit 70.

If the mode is not an information set mode, the process proceeds to step S510. If the mode is an information set mode, the process proceeds to step S506, where information is set for a designated partner.

Specifically, destination information indicating a designated partner predetermined as the destination of the image data, a telephone number in the embodiment, is set by using the operation unit 70. Subsequently, the process proceeds to step S507, where various parameters (camera information) are set. These set parameters are recorded with the image data during imaging. Then, in step S508, the set destination information and various parameters are stored in the nonvolatile memory 56, and the process proceeds to step S510. Process after step S510 is as described above.

If the imaging mode is determined in step S503, the process proceeds to step S514 shown in FIG. 7. When the shutter switch 64 is turned on, an imaging operation is executed, and the process proceeds to step S515, where the imaged image data is stored in the memory 30. Then, in step S516, determination is made as to transmission to a designated partner. If the transmission to the designated partner is determined, the process proceeds to step S517, where information, i.e., the destination information stored in the nonvolatile memory 56, is retrieved, and converted into call information. The determination of the transmission to the designated partner is made by the user with the operation unit 70. The information on the designated partner is one set in step S506. According to the embodiment of the invention, as long as there is no special instruction by the user, after the imaging; the call information on the designated partner is added to the imaged image data, and stored in the memory 30.

If there are a plurality of bits of destination information, a screen for selecting corresponding destination information from the plurality of bits of destination information is displayed on the image display 28, and transmission information selection is made by using the operation unit 70. Then, the process proceeds to step S520.

On the other hand, if the transmission to the designated partner is not determined, the process proceeds to step S518, where information on a call out partner (telephone number in the embodiment) is entered by using the operation unit 70. In subsequent step S519, the entered information is converted into call information. Then, the process proceeds to step S520.

In step S520, the call information is added to the image data and stored in the memory 30. Subsequently, the process proceeds to step S521, where determination is made as to whether the image data having the added call information is transmitted or not. If there is any trouble, for example, an operation by the user to cancel the transmission of the image by the operation unit 70 because of the discovery of an erroneous entry by the partner, or if the user wishes to transmit the image data later, then the process proceeds to step S524, where the holding/non-holding of the image data stored in the memory 30 is entered by the operation unit 70.

If the image data stored in the memory 30 is held, then the process proceeds to step S510. Processing after step S510 is similar to that described above. The held data can be transmitted later by selecting the memory image mode from the operation unit 70.

On the other hand, if the image data is not held, then in step S525, the image data stored in memory 30 is deleted, and the process proceeds to step S510.

If the execution of the image data transmission is determined in step S521, the process proceeds to step S522, where a communication process is carried out. In the communication process, first as shown in FIG. 9, in step S80, processing is executed for detecting a communicatable device. Then, in step S802, the detection of a communicatable device is determined. Here, if no communicatable devices are detected, the process proceeds to step S807, where "COMMUNICATION IMPOSSIBLE (DEVICE NONE)" is displayed on the image display 28, and the process is ended.

When the communication apparatus 300 is detected in step S802, then the process proceeds to step S803, where the image data is retrieved from the memory 30. Then, in step S804, the communication process is protocol is executed. Here, negotiation is carried out with the communication apparatus 300 through the communication circuit 110. In step S802, the detected devices are displayed on the display 2, and the user selects the communication apparatus 300 from the displayed devices. The communication circuit 110 negotiates with the communication apparatus 300.

After the establishment of the negotiation with the communication apparatus 300, the image data having the added call information is transmitted from the communication circuit 110. Then, in step S805, "COMMUNICATING" is displayed on the image display 28.

Subsequently, the process proceeds to step S806, where determination is made as to the completion of the communications. If not completed, the process returns to step S803, where the transfer of the image data is continued. If the communications are completed, the process is ended.

After the end of the communication process, the process proceeds to step S523, where determination is made as to the normal completion of the communications. If normally completed, then the process proceeds to step S510. Processing after step S510 is similar to that described above. N the other hand, if not completed normally, the process proceeds to step S509, where an error is displayed, and then the process proceeds to step S510.

If it is determined in step S504 (shown in FIG. 6) that the mode is a memory image mode, the process proceeds to step S506 of FIG. 8, where determination is made as to whether the image data in the memory 30 is transmitted or not. The determination of the transmission/non-transmission of the image data in the memory 30 is entered from the operation unit 70. If the image data in the memory 30 is transmitted, the process proceeds to step S527, where image data to be transmitted from the memory 30 I selected by the operation unit 70.

In subsequent step S528, determination as to the changing or not of the call information added to the selected image data is entered from the operation unit 70. To change the call information, the process proceeds to step S529, where information on the call out partner is entered from the operation unit 70. Then, in step S530, as described above with reference to FIGS. 5A and 5B, the entered information is converted into call information. Then, in step S531, the call information is added to the image data, stored in the memory 30, and the process proceeds to step S521 shown in FIG. 7. Processing thereafter is similar to that described above. If the call information is not changed, the process skips steps S529 to 531, and proceeds to step S521.

If no image data in the memory 30 is transmitted in step S526, the process proceeds to step S532 determining that the image data in the recording medium 120 is transmitted. Then, the image data to be transmitted from the recording medium is selected by the operation unit 70, and in subsequent step S533, the selected image data is stored in the memory 30.

Then, in step S534, specification is made by the operation unit 70 as to whether the destination partner of the selected image data is a designated partner or not. If the destination partner is a designated partner, the process proceeds to step S535, where information on the designated partner, i.e., destination information stored in the nonvolatile memory 56 is retrieved, and converted into call information. Then, proceeding to step S531, the call information is added to the image data, stored in the memory 30, and then the process proceeds to step S521 shown in FIG. 7.

On the other hand, if the transmission is not to the designated partner, the process proceeds to step S529, where information on the call out partner is entered from the operation unit 70 and, in subsequent step S531, the entered information is converted into call information. Then, proceeding to step S531, the call information is added to the image data, stored in the memory 30, and the process proceeds to step S521 shown in FIG. 7.

In this case, it is assumed that the image data recorded in the recording medium 120 contains no added call information. However, if there is image data containing added call information, recorded in the recording medium 120, then as in the case of the processing after step S528, the process is carried out according to the change or no change of the call information.

Next, description will be made of an operation performed by the communication apparatus 300 under the control of the communication system control circuit 350.

In the communication apparatus 300, as shown in FIG. 10, first, in step S901, determination is made as to whether the communication apparatus 300 has received a connection request from the imaging apparatus 100 or not. If the connection request has not been received, the process proceeds to step S913, where other processing is executed, and then the process returns to step S901.

After the reception of the connection request from the imaging apparatus 100, the process proceeds to step S902, where a connection process is carried out for making radio connection with the imaging apparatus 100 through the communication circuit 330. In subsequent step S903, determination is made as to the establishment of the connection. If the connection has not been established, the process returns to step S901.

After the establishment of the connection, a radio communicatable status is set with the imaging apparatus 100 and, in step S904, the image data transmitted from the imaging apparatus 10 and the call information added thereto are received through the communication circuit 330. Then, in step S905, the process waits for the completion of communications with the imaging apparatus 100, and when the communications are completed, the process proceeds to step S906.

In step S906, determination is made as to whether the call information has been received or not. If the reception of the call information is not determined, then the process proceeds to step S913, where corresponding processing, for example issuance of a re-transmission request to the imaging apparatus 100, is executed. Upon the reception of such a re-transmission request, the imaging apparatus transmits the call information to the communication apparatus 300.

On the other hand, if the reception of the call information is determined, the process proceeds to step S907, where determination is made as to the possibility of calling out to the communication network from the communication circuit 326. If not possible (e.g., out of range), the process returns to step S901. If possible, the process proceeds to step S908.

In step S908, calling-out is executed to the corresponding destination partner through the communication circuit 326 based on the received call information. In subsequent step S909, determination is made as to the connection with the destination partner (receiving terminal 500 of FIG. 4) has been established or not. If the connection has been established, then the process returns to step S901.

If the connection has been established, the process proceeds to step S910, where the image data received from the imaging apparatus 100 is transmitted to the destination through the communication circuit 326. In subsequent step S911, the process waits for the completion of the communications. After the completion of the communications, the process proceeds to step S912, where the connection with the destination partner is cut off, and then the process returns to step S901.

In FIG. 10, there is not clearly shown a recognition timing for the disconnection with the imaging apparatus 100 in the communication apparatus 300. However, upon the reception of a disconnection command from the imaging apparatus 100 in the communication apparatus 300, the disconnection command is recognized by other process in step S913, and the connection with the imaging apparatus 100 is cut off.

Figure 11:
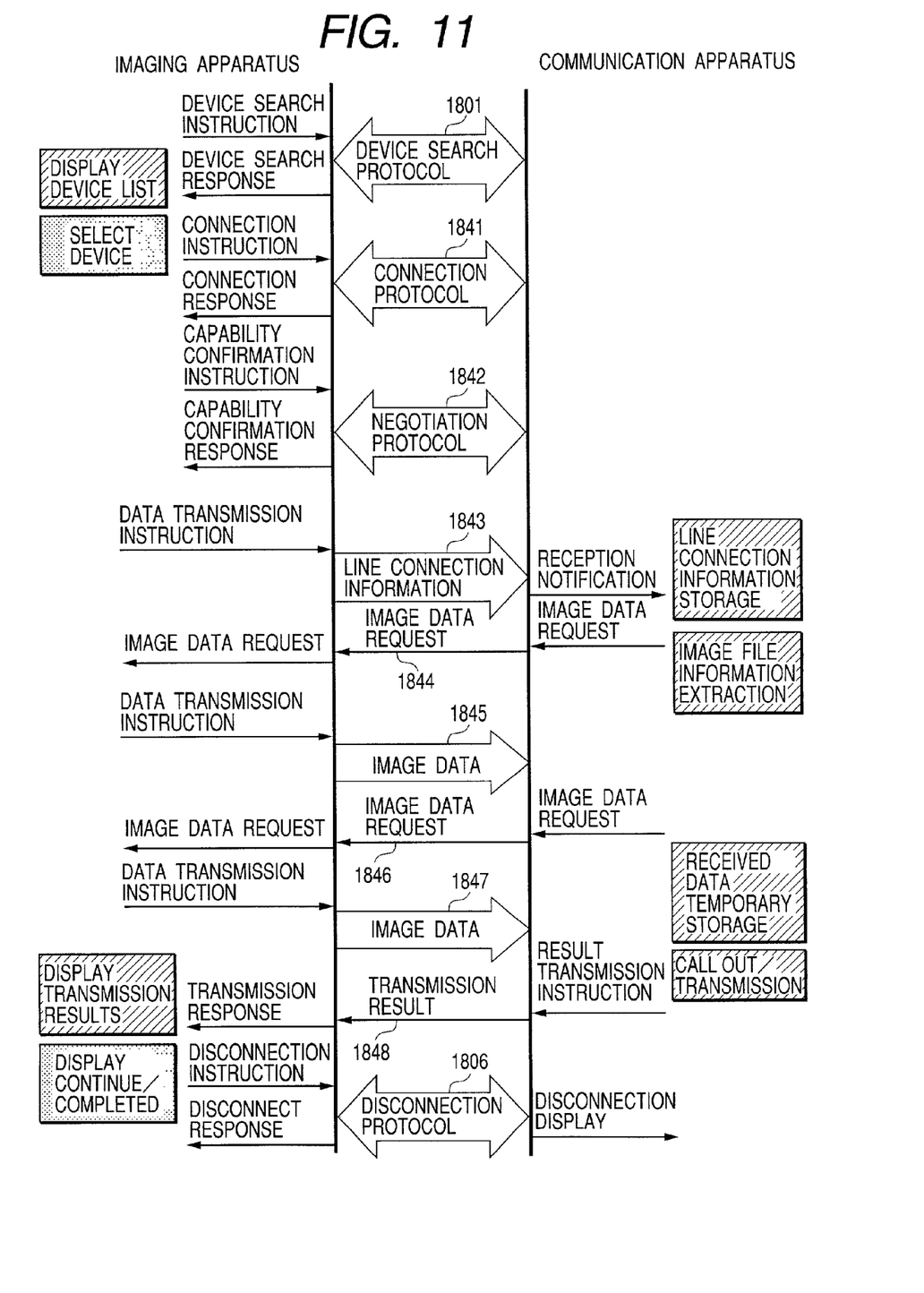
FIG. 11 is a sequence chart showing another example of a radio communication sequence between the imaging apparatus of FIG. 1 and the communication apparatus of FIG. 2.

Next, the other example of a radio communication sequence between the imaging apparatus 100 and the communication apparatus 300 will be described by referring to the sequence chart of FIG. 11.

In the communication process in step S522 of FIG. 7, the imaging apparatus 100 executes a device search protocol 1801 by using the communication circuit 110, and displays the list of the searched devices on the display 28. The user selects the communication apparatus 300 from the searched devices by using the operation unit 70, and then the communication circuit 110 executes a connection protocol 1841 and a negotiation protocol 1842. When connection is established with the communication apparatus 300 as a result, the communication circuit 110 transmits line connection information 1843 to the communication apparatus 300. The imaging apparatus 100 includes the call information stored in the memory 30 in step S520 or S530, and image file information specifying transmitted image data (file name or address of the memory 30 having the transmitted image data stored therein) in the line connection information.

Upon having received the line connection information 1843 by the communication circuit 330, the communication apparatus 300 saves the line connection information 1843 in the memory 320, extracts the image file information from the line connection information, and transmits an image data request 1844 including the image file information from the communication circuit 330 to the imaging apparatus 100. On the other hand, upon having received the image data request 1844 by the communication circuit 110, the imaging apparatus 100 transmits image data specified by the image file information included in the image data request 1844 from the communication circuit 110 to the communication apparatus 300.

Then, upon having received the image data 1845 from the imaging apparatus 100 by the communication circuit 330, the communication apparatus 300 stores the received image data 1845 in the memory 320. Here, since the image data is transmitted by being divided into a plurality of packets, the transmission of image data request 1846 and the reception of image data 1847 are repeated until the transmission of the image data is completed.

After the completion of the reception of the image data 1847, if there is a call out from the communication circuit 326 to the communication network 400, calling-out is executed from the communication circuit 326 to the communication network 400. When connection is established with the receiving terminal 500, the image data stored in the memory 320 is transmitted. The communication apparatus 300 transmits a transmission result 1848 from the communication circuit 330 to the imaging apparatus 100.

The imaging apparatus 100 receives the transmission result 1848, displays it on the display 28, and executes a disconnection protocol 1806 with the communication apparatus 300 when disconnection with the communication apparatus 300 is instructed from the operation unit 70.

In accordance with another embodiment of the invention, the imaging apparatus 100 cuts off the connection with the communication apparatus 300 after the transmission of the line connection information 1843. Then, the communication apparatus 300 executes the connection protocol with the imaging apparatus 100. After the establishment of connection, the communication apparatus 300 makes an image data request to the imaging apparatus 100, receives the image data, and transmits it to the receiving terminal 500 after the completion of the reception.

Thus, according to the embodiment, at the imaging apparatus 100, when the image data is transferred to the communication apparatus 300, the call information on the destination partner of the image data is added to the same, and the image data having the added call information is transferred to the communication apparatus 300 through the radio line. At the communication apparatus 300, calling-out is executed to the corresponding destination partner based on the call information added to the image data transferred from the imaging apparatus 100. When connection is established with the called destination partner, the image data is transmitted to the destination partner through the communication network 400.

Accordingly, the imaged image data can be immediately transmitted to a desired destination. Moreover, since the calling-out of the communication apparatus 300 is controlled from the imaging apparatus side through the radio line, the imaged image data can be transmitted only by the operation of the imaging apparatus 100, preventing the loss of portability.

The preferred embodiments of the invention have been described. However, the invention is not limited to the embodiments, and various changes and modifications can be made within appended claims.

Since the destination information indicating the designated partner is held in the nonvolatile memory 56, the operation of transmitting the image data to the designated partner can be simplified. Moreover, when the image data is transmitted to the partner other than the designated partner, the destination information on the partner different from the designated partner is entered, this entered information is converted into corresponding call information, and the call information is added to the image data. Thus, the transmission of the image data to the partner other than the designated partner can be facilitated, improving operability.

A part or all of the foregoing processes may be executed by an operating system (OS) running on a computer.

Furthermore, the functions of the foregoing embodiments may be achieved by writing a program code retrieved from the storage medium in a memory provided in a function expansion board inserted into the computer or a function expansion unit connected to the computer, and then executing a part or all of actual processes by a CPU provided in the function expansion board or the function expansion unit based on the instruction of the program code.

What is claimed is:

1. A communication apparatus comprising:
   radio communication means for communicating with a radio communication apparatus via a radio communication; and transferring means for transferring transmission data to a transmission destination of the transmission data via a communication network, wherein said radio communication means receives file name of the transmission data from the radio communication apparatus, and said radio communication means requests the radio communication apparatus to transmit the transmission data of the file name for obtaining the transmission data from the radio communication apparatus.

2. A communication apparatus according to claim 1, wherein said transferring means transfers the transmission data to the transmission destination after connection is established with the transmission destination.

3. A communication apparatus according to claim 1, wherein said radio communication means executes the radio communication upon reception of a connection request from the radio communication apparatus.

4. A communication apparatus according to claim 1, wherein said radio communication means receives the file name of the transmission data and a mail address of the transmission destination from the radio commutation apparatus.

5. A data transferring method of a communication apparatus for transferring transmission data transmitted from a radio communication apparatus to a transmission destination via the communication apparatus, comprising the steps of:
    receiving file name of the transmission data from the radio communication apparatus via a radio communication;
    requesting the radio communication apparatus via the radio communication to transmit the transmission data of the file name; and
    transferring the transmission data to the transmission destination of the transmission data via a communication network.

6. A transferring method of a communication apparatus according to claim 5, wherein in transferring step, the transmission data is transferred to the transmission destination after connection is established with the transmission destination.

7. A transferring method of a communication apparatus according to claim 5, wherein in said receiving step, the radio communication is executed upon reception of a connection request from the radio communication apparatus.

8. A transferring method of a communication apparatus according to claim 5, wherein in said receiving step, the file name of the transmission data and a mail address of the transmission destination is received from the radio communication apparatus.

9. A computer-readable medium storing a computer program for a communication apparatus for transferring transmission data transmitted from a radio communication apparatus to a transmission destination via the communication apparatus, comprising the steps of:
    receiving file name of the transmission data from the radio communication apparatus via a radio communication;
    requesting the radio communication apparatus via the radio communication to transmit the transmission data of the file name; and
    transferring the transmission data to the transmission destination of the transmission data via a communication network.

10. A computer-readable medium according to claim 9, wherein in said transferring step, the transmission data is transferred to the transmission destination after connection is established with the transmission destination.

11. A computer-readable medium according to claim 9, wherein in said receiving step, the radio communication is executed upon reception of a connection request received from the radio communication apparatus.

12. A computer-readable medium according to claim 9, wherein in said receiving step, the file name of the transmission data and a mail address of the transmission destination is received from the radio communication apparatus.

* * * * *